United States Patent [19]
Riesberg

[11] Patent Number: 5,107,600
[45] Date of Patent: Apr. 28, 1992

[54] PARALLEL MEASURING GUIDE DEVICE

[76] Inventor: Robert E. Riesberg, 301 E. Harrison St., Elmwood, Ill. 61529

[21] Appl. No.: 744,330

[22] Filed: Aug. 13, 1991

Related U.S. Application Data

[63] Continuation of Ser. No. 307,297, Feb. 6, 1989, abandoned, Continuation-in-part of Ser. No. 293,648, Jan. 5, 1989, abandoned, Continuation-in-part of Ser. No. 8,288, Jan. 29, 1987, abandoned, Continuation-in-part of Ser. No. 840,530, Mar. 14, 1986, abandoned, Continuation of Ser. No. 632,720, Jul. 20, 1984, abandoned.

[51] Int. Cl.$^5$ .................... B27B 27/02; B27G 23/00
[52] U.S. Cl. ........................ 33/640; 33/626; 33/633; 33/645; 33/454; 33/809
[58] Field of Search ............... 33/626, 630, 633, 640, 33/645, 454, 464, 809–812, DIG. 9, 628; 83/421; 269/318

[56] References Cited

U.S. PATENT DOCUMENTS

| | | | |
|---|---|---|---|
| 184,459 | 11/1876 | Coats | 33/613 |
| 368,995 | 8/1887 | Daily et al. | 33/464 |
| 396,666 | 1/1889 | Prince | 83/438 |
| 479,807 | 8/1892 | Holcomb | 33/816 |
| 826,759 | 7/1906 | Branch | 33/464 |
| 1,129,705 | 2/1915 | Messier | 33/810 |
| 1,360,492 | 11/1920 | Benson | 33/600 |
| 2,700,993 | 2/1955 | Pence | 33/628 |
| 3,296,704 | 1/1967 | Zajkowski | 33/501.1 |
| 3,325,162 | 6/1967 | Lukas | 33/567.1 |
| 3,427,722 | 2/1969 | Ingram | 33/464 |
| 3,888,477 | 6/1975 | Tate | 33/501 |
| 4,002,329 | 1/1977 | Petrowski | 83/437 |
| 4,284,871 | 8/1981 | Mawson et al. | 219/121.56 |
| 4,930,221 | 6/1990 | Taylor | 33/640 |

FOREIGN PATENT DOCUMENTS

| | | |
|---|---|---|
| 1437948 | 3/1966 | France . |
| 2079460 | 1/1982 | United Kingdom . |

*Primary Examiner*—William A. Cuchlinski, Jr.
*Assistant Examiner*—Alvin Wirthlin
*Attorney, Agent, or Firm*—Bierman & Muserlian

[57] ABSTRACT

An apparatus for ensuring parallel measuring, alignment and minimum spacing of two objects, particularly for setting a rip fence in connection with a table saw or drill press, having a first rectangular end plate provided with at least two rods perpendicularly extending from one side thereof, a second plate moveably mouted on the rods, parallel to the first end plate and capable of meeting flush therewith, the second plate is capable of being secured in position to the rods. At least one measuring scale is provided on the rods. The first plate has ribs located thereon for preventing the first plate from slipping into a miter slot, and the second plate has slots for receiving the ribs of the first plate.

6 Claims, 3 Drawing Sheets

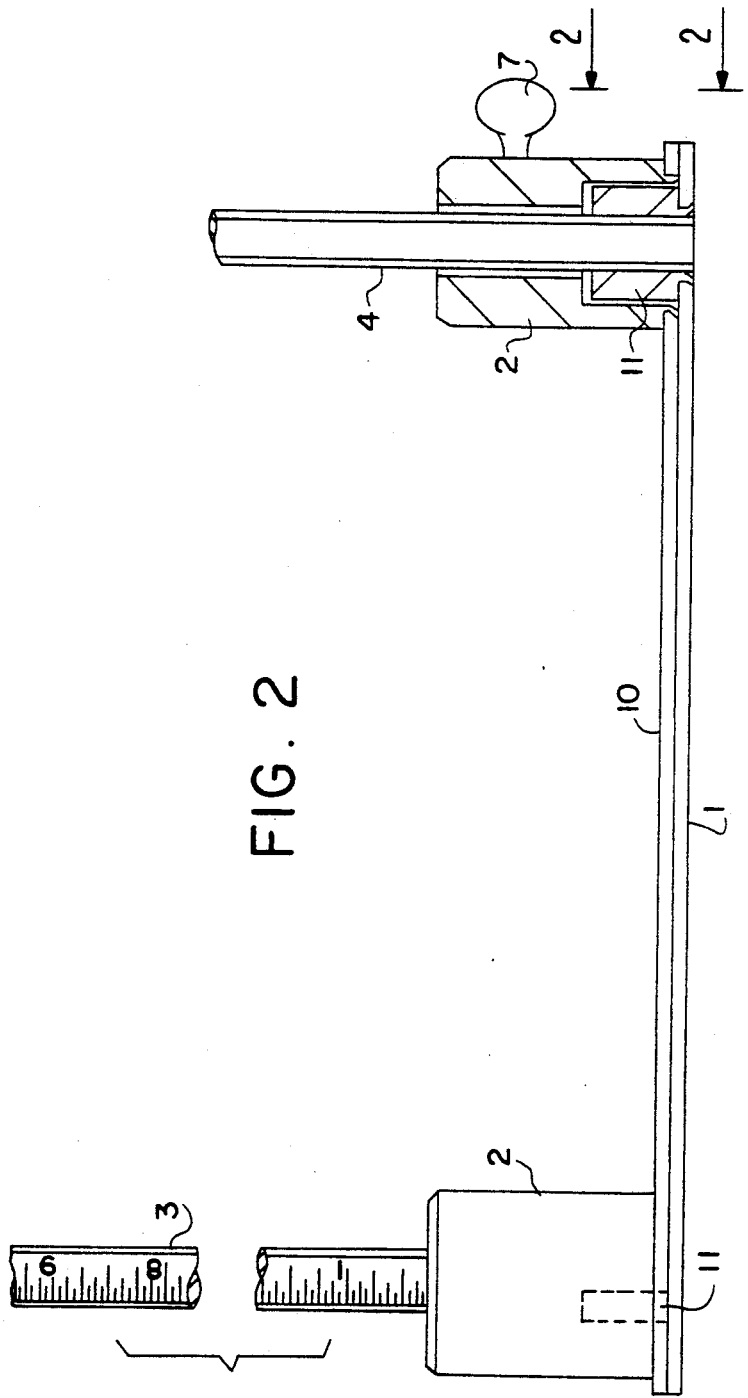

PARALLEL MEASURING GUIDE DEVICE

PRIOR APPLICATION

This application is a continuation of U.S. patent application Ser. No. 307,297 filed Feb. 6, 1989 which is a continuation-in-part of U.S. application Ser. No. 293,648 filed Jan. 5, 1989 which is a continuation-in-part of U.S. patent application Ser. No. 008,288 filed Jan. 29, 1987 which is a continuation-in-part of U.S. patent application Ser. No. 840,530 filed Mar. 14, 1986 which is a continuation of U.S. patent application Ser. No. 632,720 filed Jul. 20, 1984, all now abandoned.

STATE OF THE ART

Table saw rip-fences are not always parallel with the saw blade and when the front end of the rip-fence is tightened to the saw table, the back end of the saw fence invariably moves out of parallel alignment before the set screw on the back end of the rip fence is tightened. U.S. Pat. No. 2,764,190 describes an adjustment tool capable of making fine adjustments to the spacing between the rip fence and a saw blade but only after having first made time consuming initial measurements with a separate measuring device.

OBJECTS OF THE INVENTION

It is an object of the invention to provide an apparatus for accurately and rapidly providing parallel spacing of two objects.

It is an another object of the invention to provide an apparatus for a setting guide for parallel alignment of a rip-fence and a saw blade and for squaring the saw blade to the work table of table and radial arm saws.

These and other objects and advantages of the invention will become obvious from the following detailed description.

THE INVENTION

The apparatus for ensuring parallel measuring, alignment and minimum spacing of two objects, particularly for setting a rip fence in connection with a table saw or drill press, comprises a rectangular end plate provided with at least two rods perpendicularly extending from one side thereof, means for securing said rods in position to said end plate, a second plate moveably mounted on said rods, parallel to said end plate and capable of meeting flush therewith, means for securing said second plate in position to said rods, at least one measuring scale being provided on said rods to obtain parallel alignment of said rip fence or minimum spacing of said objects, said plates having their long sides lying vertically in the same plane when on a work surface whereby the second end plate will assure the perpendicular position of a saw blade and the first end plate will align a rip fence.

The apparatus is a valuable parallel measuring device having a plurality of uses. For example, one practical use is for simultaneously accurately spacing studs and providing a brace during toe-nailing of the studs in place. Another practical one is as a setting guide for table saws and radial arm saws. The end plates are of sufficient height to rest against the saw blade. Basically, the apparatus is useful whenever parallel ruling, spacing and/or alignment is desired.

The apparatus maybe made of any desired material as long as it maintains its rigidity. For example, the two plates may be made of wood, metal or plastic and the rods may be made of the same or different material and may be hollow or solid. The rods may be permanently attached to the end plate but are preferably removable for replacement in case of damage thereto or breakage thereof. When the apparatus is used as a setting guide for a saw rip-fence, it eliminates any possibility of the fence moving out of alignment by pressing the end plate of the tool against the rip fence and then tightening the front and rear set screws of the rip fence. This provides the same spacing between the front and back ends of the saw blade with the rip fence.

The measuring scales provided on the rods which may be any shape, i.e. round, square or triangular, may be in inches or in the metric system or both.

Referring now to the drawings:

FIG. 1 is a plan view of one embodiment of the apparatus of the invention in use with the setting of a rip guide for a table saw with a second end plate with a U profile and FIG. 2 is a second embodiment with both end plates planar.

FIG. 2 is a plan view of a second embodiment of the invention in which the second end plate is planar and the first end plate is provided with ribs or fingers.

FIG. 3 is an end view of plate 1.

Figure 1:
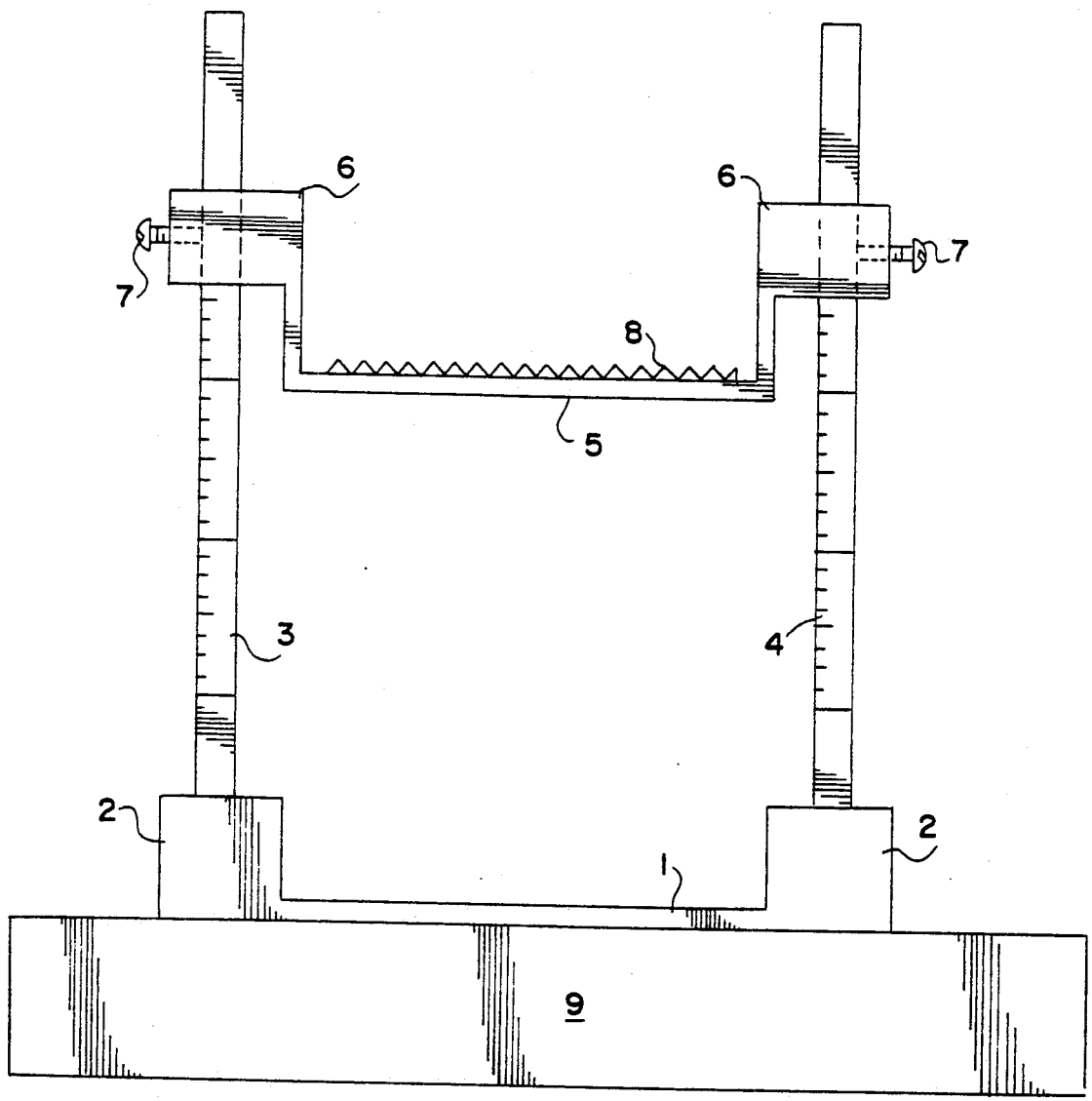
Figure 4:
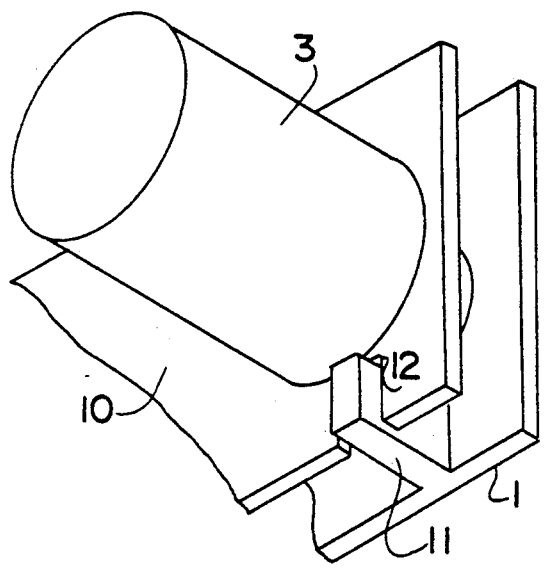
FIG. 4 is a partial cross-section of FIG. 2 taken along line II—II.
Figure 5:
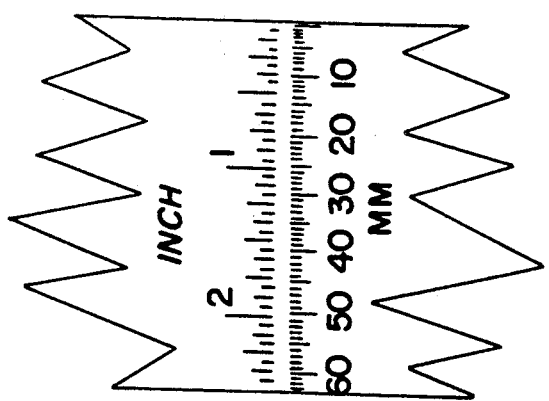
FIG. 5 is a depth scale which appears on end plate 5.

In FIG. 1, the apparatus is comprised of planar end plate 5 provided with means 2 for securing rods 3 and 4 perpendicular to the plate 1. The rods 3 and 4 are provided with a measuring scale beginning at the end plate end thereof. The second planar plate 5 parallel to the end plate is provided with holes 6 adapted to the configuration of rods 3 and 4 and with lock screws 7 to secure the plate 5 to the rods. In the figure, the plate 5 is shown in a U-shape but it can also be completely planar as in FIG. 2. When using the apparatus as discussed above, the plate 5 is placed against the saw blade 8 and then rip guide 9 is placed against end plate 1 for true alignment and then is secured in position.

In FIGS. 2 to 5, the second end plate 10 is planar and the bosses 2 are secured to end plate 10 so as not to interfere with the planar contact of plates 1 and 10. When the apparatus used for calibrating the distance of the rip fence to the saw blade and the spacing falls in the area of the miter slot, the plate 1 could possibly slip into the miter slot because the plate is thin and thereby would lose its effect. To avoid this possibility, plate 1 is provided with a set of fingers or ribs 11 which engage with slots 12 in plate 10 which prevents plate 1 from slipping into the miter slot. This also avoids any problems with ribbed table tops. Plate 10 is provided with a depth scale when resting against the saw blade to measure the depth of a cut made with a saw blade when making dado cuts with a table saw or with a radial arm saw whose blade is adjusted downward.

Various modifications of the apparatus of the invention may be made without departing from the spirit or scope thereof and it is to be understood that the invention is intended to be limited only as defined in the appended claims.

What I claim is:

1. A portable apparatus for ensuring parallel measuring, alignment, spacing and height measurement for setting a rip fence in connection with a table saw or radial arm saw, consisting essentially of a thin first rectangular end plate with long sides and short sides and provided with two rods perpendicularly extending from one face thereof, means for securing said rods in position to said first end plate, a thin second end plate, with a depth scale, having sufficient surface area to determine perpendicular position and height of a saw blade, with long sides and short sides movably mounted on said rods, means for securing said second plate in position to said rods to obtain parallel alignment of said rip fence to said saw blade and for spacing of said rip fence from said saw blade, the first plate being provided with ribs, said plates having their faces lying in parallel vertical planes when on a horizontal work surface, the second end plate being provided with slots to optionally receive the ribs of the first plate, whereby said endplates are capable of meeting flush, thus providing minimum spacing between said rip fence and said saw blade.

2. The apparatus of claim 1 wherein the rods are detachable from the end plates.

3. The apparatus of claim 1 wherein the rods are provided with both a metric scale and an English scale.

4. A portable apparatus for ensuring parallel measuring, alignment, space and height measurement for setting a rip fence in connection with a table saw or radial arm saw, consisting essentially of a thin first rectangular end plate with long sides and short sides and provided with two rods perpendicularly extending from one face thereof, means for securing said rods in position to said first end plate, a thin second end plate, with a depth scale, having sufficient surface area to determine perpendicular position and height of a saw blade, with long sides and short sides movably mounted on said rods, means for securing said second plate in position to said rods, a measuring scale being provided on said rods to obtain parallel alignment of said rip fence to said saw blade and for spacing said rip fence from said saw blade, the first plate being provided with ribs, said plates having one of their long sides in contact with a horizontal work surface with their faces in parallel vertical planes when on the work surface, the second end plate being provided with slots to optionally receive the ribs of the first plate, whereby said endplates are capable of meeting flush, thus providing minimum spacing between said rip fence and said saw blade.

5. The apparatus of claim 4 wherein the rods are detachable from the end plates.

6. The apparatus of claim 4 wherein the rods are provided with both a metric scale and an English scale.

* * * * *